US006814390B2

(12) United States Patent
Habacker (10) Patent No.: US 6,814,390 B2
(45) Date of Patent: Nov. 9, 2004

(54) CONVERTIBLE VEHICLES HAVING COVER PLATES FOR COVERING FOLDING TOP PASSAGE APERTURES

(75) Inventor: Norbert Habacker, Bramsche (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/672,223

(22) Filed: Sep. 26, 2003

(65) Prior Publication Data

US 2004/0061353 A1 Apr. 1, 2004

(51) Int. Cl.⁷ ............................................. B60J 7/20
(52) U.S. Cl. ............................ 296/107.08; 296/136.06
(58) Field of Search ....................... 296/107.08, 136.05, 296/135.06, 136.09

(56) References Cited

U.S. PATENT DOCUMENTS

| | | | | |
|---|---|---|---|---|
| 2,747,928 A | * | 5/1956 | Oliver et al. ............ | 296/107.08 |
| 5,253,917 A | * | 10/1993 | Brueggemann ............ | 296/218 |
| 5,558,389 A | * | 9/1996 | Rothe et al. ............ | 296/107.08 |
| 5,788,316 A | * | 8/1998 | Rothe .................... | 296/107.07 |
| 5,816,644 A | * | 10/1998 | Rothe et al. ............ | 296/107.18 |
| 5,921,608 A | * | 7/1999 | Schmitt et al. .......... | 296/107.08 |
| 5,967,593 A | * | 10/1999 | Schuler et al. .......... | 296/136.06 |
| 6,193,301 B1 | * | 2/2001 | Baumeier et al. ......... | 296/121 |
| 6,318,792 B1 | * | 11/2001 | Neubrand et al. ........ | 296/107.08 |
| 6,364,396 B1 | * | 4/2002 | Hayashi et al. ......... | 296/136.06 |
| 6,447,050 B1 | * | 9/2002 | Plassmeyer et al. ..... | 296/180.5 |
| 6,454,342 B2 | * | 9/2002 | Heselhaus et al. ...... | 296/107.07 |
| 6,454,343 B1 | * | 9/2002 | Wagner et al. .......... | 296/107.08 |
| 6,502,891 B2 | * | 1/2003 | Russke ................... | 296/107.17 |
| 6,508,504 B1 | * | 1/2003 | Conradt et al. ......... | 296/136.06 |
| 6,511,118 B2 | * | 1/2003 | Liedmeyer et al. ...... | 296/107.17 |
| 6,536,831 B2 | * | 3/2003 | Rothe et al. ............ | 296/107.07 |
| 6,578,898 B2 | * | 6/2003 | Rothe et al. ............ | 296/107.07 |
| 6,604,774 B2 | * | 8/2003 | Koch et al. ............. | 296/107.08 |
| 6,616,213 B2 | * | 9/2003 | Koch ..................... | 296/107.08 |
| 6,644,715 B1 | * | 11/2003 | Bohnke ................. | 296/107.08 |
| 6,663,163 B2 | * | 12/2003 | Koch ..................... | 296/107.08 |
| 6,682,124 B1 | * | 1/2004 | Bohnke ................. | 296/107.08 |
| 6,682,149 B1 | * | 1/2004 | Guillez et al. .............. | 296/108 |

FOREIGN PATENT DOCUMENTS

| | | | | |
|---|---|---|---|---|
| DE | 3801148 C1 | * | 4/1989 | ............. B60J/7/20 |
| DE | 29602762 U1 | * | 6/1997 | ............. B60J/7/12 |
| DE | 19912893 A1 | * | 9/2000 | ............. B60J/7/20 |

* cited by examiner

Primary Examiner—Patricia L. Engle
(74) Attorney, Agent, or Firm—Michael Best & Friedrich LLP (57) ABSTRACT

Convertible vehicles (1) include passage apertures (7) defined in longitudinally-extending side walls (6) of a vehicle body (1a). A guiding element (9) is disposed in or below each passage aperture. Foldable, longitudinally-extending components (21) are disposed along side edges of a foldable frame (20), which components pass through the passage aperture (7) during foldable top opening and closing operations. A storage compartment lid (2) is movably coupled to the vehicle body for covering the folding top. A cover plate (8) is movably coupled to the lid and moves towards the passage aperture during the folding top opening operation. A safety catch (10) may be coupled to the cover plate so as to engage the guiding element during the folding top opening operation. The safety catch and guiding element serve to accurately guide and position the cover plate during the folding top opening operation.

20 Claims, 5 Drawing Sheets

CONVERTIBLE VEHICLES HAVING COVER PLATES FOR COVERING FOLDING TOP PASSAGE APERTURES

CROSS-REFERENCE

This application claims priority to German patent application no. 102 45 361.6 filed Sep. 28, 2002, the contents of which are incorporated by reference as if fully set forth herein.

TECHNICAL FIELD

The present invention relates to convertible vehicles having a folding top that can be lowered into a folding top storage compartment defined within the convertible vehicle, which compartment is closed or covered by a movable storage compartment lid. More particularly, cover plates are described for covering passage apertures designed to permit longitudinally-extending side edges of the folding top to be extended from the folding top storage compartment when the folding top is moved to a roof closed position.

RELATED ART

German Patent No. 38 01 148 C1 discloses a convertible vehicle having a retractable folding top, in which folding top frame (linkage) elements extend along the longitudinal edges of the folding top. The folding top frame elements pass through apertures (passage apertures) defined within the upper edges of the respective longitudinal side walls of the convertible vehicle body when the foldable top is opened and closed, so as to dispose the folding top in a folding top storage compartment defined within the convertible vehicle. A storage compartment lid is provided to cover the folding top when it has been stored in (retracted into) the folding top storage compartment. Further, the respective passage apertures are closable (coverable) by a pair of cover plates coupled to the folding top storage compartment lid. Each cover plate is pivotably supported on the underside of the folding top storage compartment lid and can be pivoted into the aperture covering or closing position by a driving mechanism, to thereby cover the passage aperture.

German Laid-open Patent Publication No. 199 12 893 A1 also describes cover plates or cover lids for covering respective apertures defined within the convertible vehicle body when the folding top has been stored in (retracted into) the folding top storage compartment. Each cover plate is pivotably supported by a pivoting mechanism that pivotably raises and lowers the cover plate so as to cover the aperture. Furthermore, a roller is provided at the terminal end of each cover plate, which roller engages a holding device when the cover plate is disposed in the aperture covering position (i.e., when the folding top is stored within the folding top storage compartment).

U.S. Pat. No. 5,921,608 discloses a cover flap assembly for a passage opening defined in a side wall of a convertible vehicle body. The cover flap is moved to a passage opening position by a combined rotating and linear movement, so that the cover flap is moved below the adjacent panelling disposed on the side wall of the convertible vehicle body. This rotating and linear movement is effected by a carriage (guiding) device that is connected to a folding top storage compartment lid via a Bowden cable.

SUMMARY OF THE INVENTION

It is one object of the present invention to provide improved cover plates (cover lids) for covering passage apertures defined within a convertible vehicle body.

In one aspect of the present teachings, the cover plate(s) may be coupled to, and operable with, a folding top storage compartment lid. In other words, when the folding top (foldable roof) has been moved into (stored in) a folding top storage compartment defined within the convertible vehicle body, the folding top storage compartment lid is operated (moved) so as to cover the stored folding top. Preferably, the cover plate(s) is (are) also operated (moved) at this time so as to cover the corresponding passage aperture defined within a longitudinally-extending side wall of the convertible vehicle body. The passage aperture(s) is (are) defined so that the longitudinally-extending folding top frame (linkage) elements (i.e., foldable frame elements that support a roof covering) can be moved into and out of the folding top storage compartment in order to open and close the folding top. Optionally, passage apertures are preferably defined in each longitudinally-extending side wall of the convertible vehicle body. Further, each passage aperture may be continuous with (communicates with) the folding top storage compartment that is defined within the vehicle body for storing the folding top when the folding top is disposed in the folding top open position.

In another aspect of the present teachings, when the folding top storage compartment lid is operated (moved) so as to permit the folding top to be moved to the folding top closed position, the cover plate may be operably coupled to this movement, thereby enabling the cover plate to simultaneously open the passage aperture and permit the longitudinally-extending, outer edge components of the folding top frame (linkage) to be withdrawn from the folding top storage compartment.

In another aspect of the present teachings, the cover plate optionally may be designed so as to be moved along a vehicle-specific guide path with minimal technical effort. In other words, the particular movement path of the cover plate may be advantageously modified according to the particular vehicle body design for which the folding top is incorporated. In this case, the cover plate will avoid unintended contact with vehicle body components surrounding the passage aperture when the cover plate is moved to cover and uncover the passage aperture.

In another aspect of the present teachings, the cover plate may also provide a pivotally stable engagement unit when the folding top is disposed in the top open position and the covering plate is engaged with the vehicle body, thereby securely covering (closing) the passage aperture.

In another aspect of the present teachings, the cover plate optionally may be designed so as to optically (visually) integrate the cover plate with the contour of the vehicle body, thereby providing a visually appealing appearance.

In one representative embodiment of the present teachings, the cover plate preferably includes a safety catch designed to operate together (couple) with a guide element that is disposed (or mounted) on the vehicle body. The safety catch and the guide element preferably may define an engagement unit that becomes operative by movement of the folding top storage compartment lid. This engagement unit also may be easily designed so as to accurately position the cover plate over (or in) the passage aperture so that the cover plate accurately and securely covers (closes) the passage aperture when the folding top has been stored in the folding top storage compartment.

In another representative embodiment, the covering plate may be guided along the vehicle body contour toward the passage aperture covering position by a combined pivoting/linear extending movement. The pivoting movement may be transmitted from the folding top storage compartment lid, when the folding top storage compartment lid is being moved to cover the stored folding top. In this case, the cover plate may be moved (extended) towards the passage aperture along a path that avoids contact with surrounding vehicle body components and achieves an optimal closed (engaged) position in the area surrounding the passage aperture.

In the final phase of this preferred joint closing movement of the folding top storage compartment lid and the cover plate, the cover plate is preferably guided by the safety catch into a closed (covering) position so that the cover plate is disposed an optimal closed (covering) position with respect to the vehicle shoulder line. This feature of the present teachings also optionally may be utilized to provide a visually appealing overall appearance for the rear portion of the convertible vehicle body when the folding top is stored.

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE INVENTION

In a representative embodiment of the present teachings, convertible vehicles may preferably include a vehicle body having at least one passage aperture defined at an upper edge of a longitudinally-extending side wall of the vehicle body. A folding top storage compartment may be defined adjacent to, and communicate with, the passage aperture. A guiding element may be disposed on the vehicle body in or below the (each) passage aperture.

A retractable folding top may include a foldable frame having foldable, longitudinally-extending components disposed along longitudinal side edges of the foldable frame. The foldable, longitudinally-extending components disposed along the longitudinal side edges of the foldable top are preferably designed to pass through the passage aperture during foldable top opening and closing operations. Further, a folding top storage compartment lid may be movably coupled to the vehicle body so as to cover the folding top storage compartment when the retractable folding top is stored within the folding top storage compartment. The foldable frame preferably supports a roof covering.

A cover plate is preferably coupled, e.g., movably coupled, to the folding top storage compartment lid. In other words, the cover plate may be coupled to the folding top storage compartment lid in a manner that permits the cover plate to move (e.g., pivot) with respect to the folding top storage compartment lid. Further, the cover plate may preferably move along an arched or curved path, which includes linear and pivoting movement components, towards the passage aperture during the folding top opening operation (i.e., during the passage aperture closing operation). In addition, a safety catch may be coupled (e.g., pivotably coupled) to the cover plate so as to contact and then securely engage the guiding element during the folding top opening operation. In this case, the cover plate can be accurately positioned over or within the passage aperture, because the safety catch and guiding element will cooperate as a movement guiding structure for the cover plate with respect to the passage aperture. The safety catch also preferably releases from the guiding element during the folding top closing operation, so as to open the passage aperture and permit the foldable top to be extended to the roof closed position.

The cover plate may be moved into a holding or engagement position in the area of the passage aperture by the safety catch during the folding top opening operation and may be moved away from the passage aperture during the folding top closing operation. Optionally, the cover plate may be (i) movable together with the folding top storage compartment lid, (ii) pivoted into an intermediate position during an initial movement phase, at which intermediate position the safety catch initially contacts the guiding element, and (iii) then extended along an arched (e.g., slightly curved), but substantially horizontal, movement path in a subsequent movement phase. An actuation member optionally may be utilized to move the cover plate into the intermediate position independent of the movement of the folding top storage compartment lid.

The safety catch may preferably include a pivotable catching arm designed to contact and engage the guiding element during the folding top opening operation. The catching arm may optionally be: (i) positioned so as to contact the guiding element during an initial phase of the folding top opening operation, (ii) then pivoted relative to a mounting plane of the cover plate by the forward movement of the folding top storage compartment lid, and (iii) then firmly engaged with the guiding element in an engagement position when the folding top has been opened, thereby firmly securing the cover plate over or in the passage aperture.

The catching arm may be pivotably supported at a forward edge of the cover plate and may be biased towards an initial position by a biasing element, such as, but not limited to, a spring, e.g., a coil or torsion spring. In addition or in the alternative, the catching arm may include a roller that slidably contacts and then engages the guiding element during the folding top opening operation. In this case, the guiding element may have a holding contour for receiving the roller.

A retaining pin optionally may couple the guiding element to the vehicle body. In this case, the retaining pin preferably includes a contact base defined at a terminal, upper end of a contact base designed to support a bearing plate defined within the safety catch. A hinge may pivotably couple the safety catch to an articulated, supporting part of the folding top storage compartment lid. The hinge may include a biasing means (e.g., a spring) that biases the hinge towards an extended position. The hinge being may be disposed at an opposite end from a supporting hinge disposed within the safety catch, which supporting hinge may pivotably support the catching arm. Further, a cable or other actuation means may be connected to the articulated, supporting part in order to apply a pressure that folds the articulated, supporting part when the folding top is moved to the folding top closed position. By folding the articulated, supporting part when the cover plate is not covering the passage aperture, the cover plate and the articulated supporting part may be stored more compactly.

Each of the additional features and teachings disclosed below may be utilized separately or in conjunction with other features and teachings to provide improved folding tops and convertible vehicles and methods for designing and using such foldable tops and convertible vehicles. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
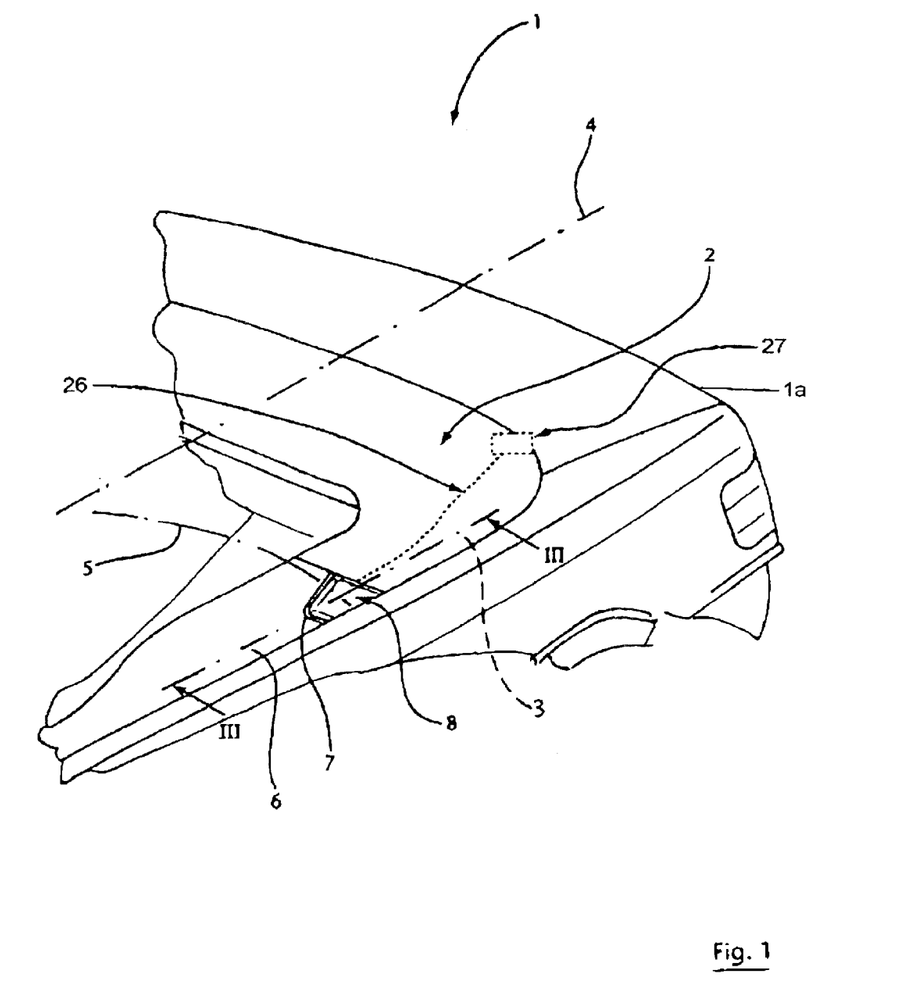
FIG. 1 shows a perspective representation of the rear portion of a representative convertible vehicle having a passage aperture defined within the upper side wall of the vehicle body, which passage aperture is covered (closed) by a representative cover plate.
Figure 6:
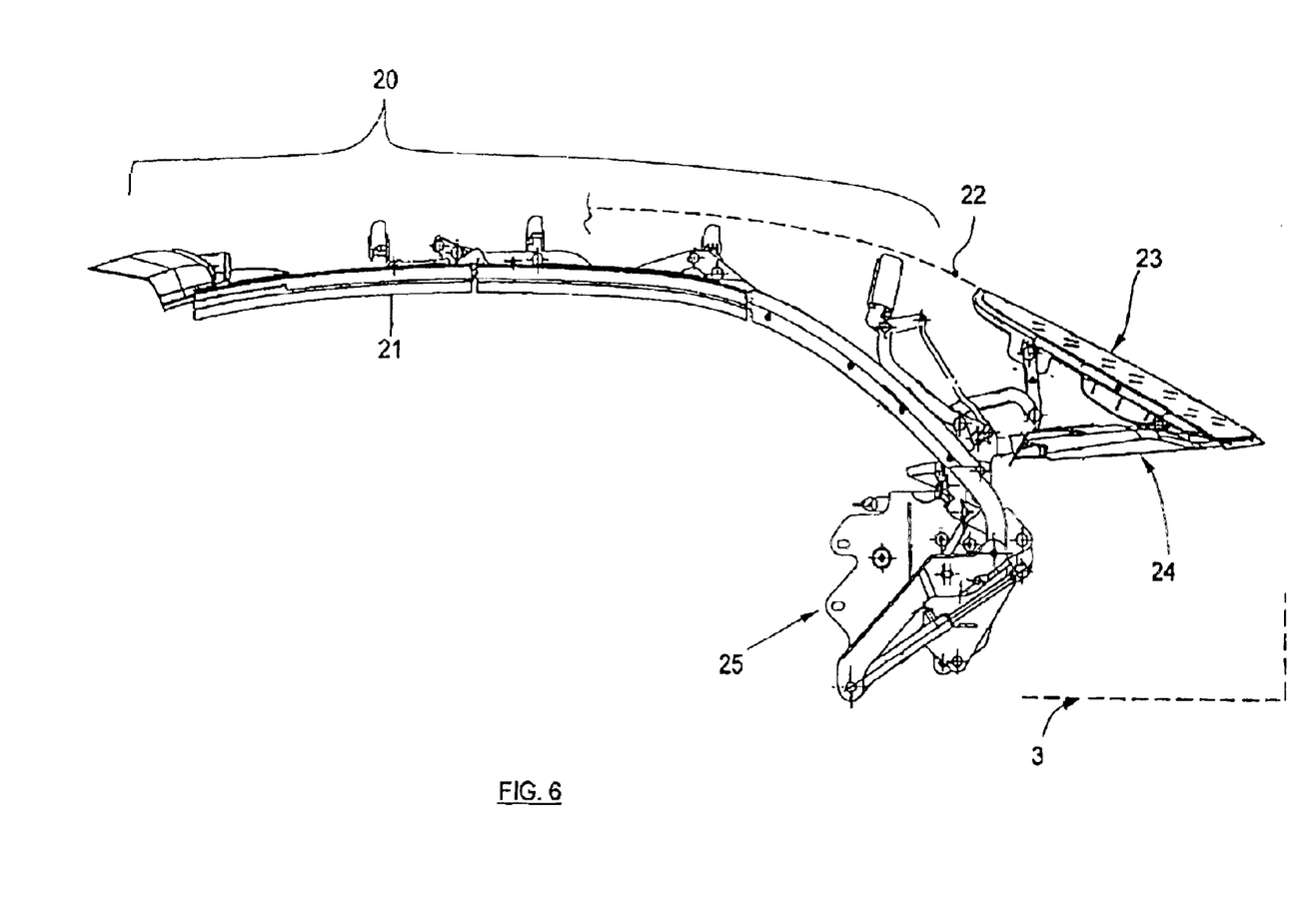
FIG. 6 shows a representative foldable frame for supporting a roof covering, the foldable frame being disposed in a folding top closed position.
Figure 7:
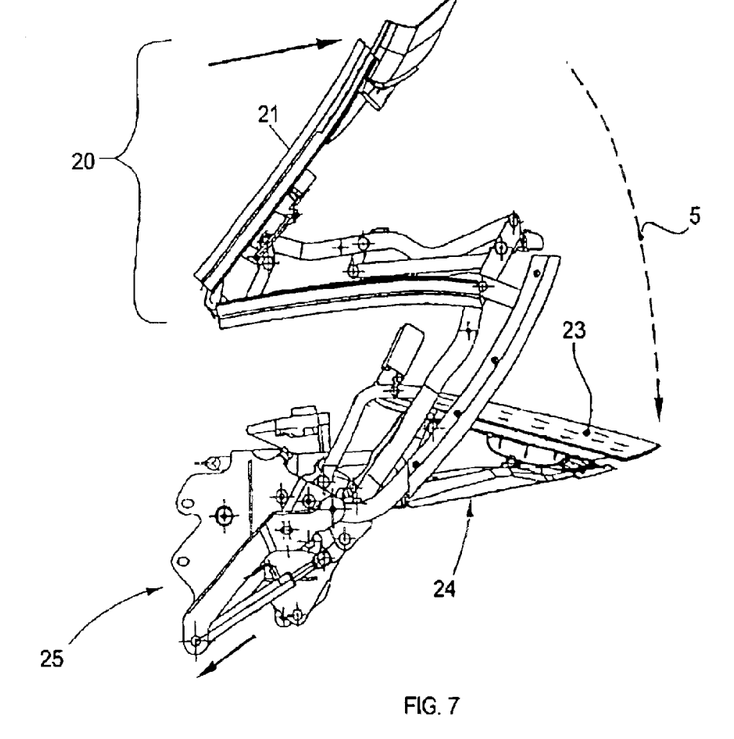
FIG. 7 shows the foldable frame of FIG. 6 in an intermediate stage of a folding top opening operation.

FIG. 1 shows the rear portion of a convertible vehicle 1, in which the folding (or foldable) top 20 is not visible because the folding top 20 has been lowered (retracted) into a folding top storage compartment 3 that is defined within the vehicle body 1a. Referring to FIGS. 6 and 7, a representative folding top 20 suitable for use with the present teachings may include longitudinally-extending, foldable components 21 that, in part, form a foldable frame for foldably supporting a roof covering 22 (represented by a broken line for the sake of clarity). The foldable frame may include a main mounting (bearing) 25 for pivotably coupling the foldable frame within the interior of the vehicle body 1a. Further, a rear window 23 may be supported within the roof covering 22 and a tensioning bow 24 may be provided to tension the rear portion of the roof covering 22. The rear window 23 may be fixedly or detachably coupled to the tensioning bow 24. Various foldable frame designs are suitable for, and may be advantageously utilized with, the present teachings and the present teachings are not particularly limited in this respect.

Referring back to FIG. 1, a folding top storage compartment lid 2 is shown covering the folding top 20 that is stored within the storage compartment 3. As indicated above, during the respective folding top opening and closing operations, the foldable top 20 is moved by the foldable frame, including the longitudinally-extending components 21 that extend along the longitudinal side edges of the foldable top 20 in parallel to the longitudinal middle plane 4 of the vehicle body 1a. During these operations, the respective longitudinally-extending components 21 move along a curved path, which is illustrated by broken line 5 in FIGS. 1 and 7, and pass through respective passage apertures 7 defined in the upper side wall edge 6 of the vehicle body 1a, as shown in FIG. 1. Only one passage aperture 7 is shown in FIG. 1 for the sake of clarity, although it should be understood passage apertures 7 are preferably defined within each respective upper side wall edge 6 of the vehicle body 1a. In the illustrated folding top open position shown in FIG. 1, the passage aperture 7 is closed (covered) by a cover plate 8, although the cover plate 8 is moved away from the passage aperture 7 when the folding top 20 is moved to the folding top closed position.

The cover plate 8 may be designed, e.g., in accordance with the teachings of German Utility Model Publication No 296 02 762.6, in which a slidable cover plate 8 is movable to below the upper side wall edge 6 when the folding top 20 is opened, or in accordance with the teachings of German Patent Publication No. 38 01 148 C1, in which the cover plate 8 is coupled to the front end of the folding top storage compartment lid 2 and can be moved by an actuation member that includes, e.g., a tensioning rope or cable (e.g., a sheathed cable). Both German Utility Model Publication No 296 02 762.6 and German Patent Publication No. 38 01 148 C1 are incorporated by reference as if fully set forth herein. However, it should be noted that various cover plate designs may be readily utilized with the present teachings and the present teachings are not particularly limited in this regard.

In the representative embodiment shown herein, the cover plate 8 is coupled to the folding top storage compartment lid 2 such that, during the folding top opening operation (movement sequence according to FIGS. 2 to 5, in which the cover plate 8 is moved or shifted so as to cover or close the passage aperture 7), a safety catch 10 contacts and engages a guide element 9. Preferably, the guide element 9 is positioned (or mounted) on the vehicle body 1a within or below the passage aperture 7 so as to receive a catching arm 11 of the safety catch 10 when the cover plate 8 is moved towards the passage aperture closing position by the folding top storage compartment lid 2. For example, the safety catch 10 is preferably designed so as to accurately move or guide the cover plate 8 into the proper engaging (holding) position in the area surrounding the passage aperture 7 during the folding top opening operation. In addition, the folding top storage compartment lid 2 may also be simultaneously moved with the cover plate 8 in order to cover the folding top storage compartment 3, although these respective movements also may be activated separately and/or independently.

In order to position the cover plate 8 in its intermediate position (FIG. 2), actuation independent of the movement of the folding top storage compartment lid (arrow A) is also possible and the present teachings are again not particularly limited in this regard. FIG. 1 shows a cable 26, which may be a sheathed cable, coupled to the cover plate 8, which may be actuated by a drive means 27, so as to move the cover plate 8 independently of the folding top storage compartment lid 2.

Figure 2:
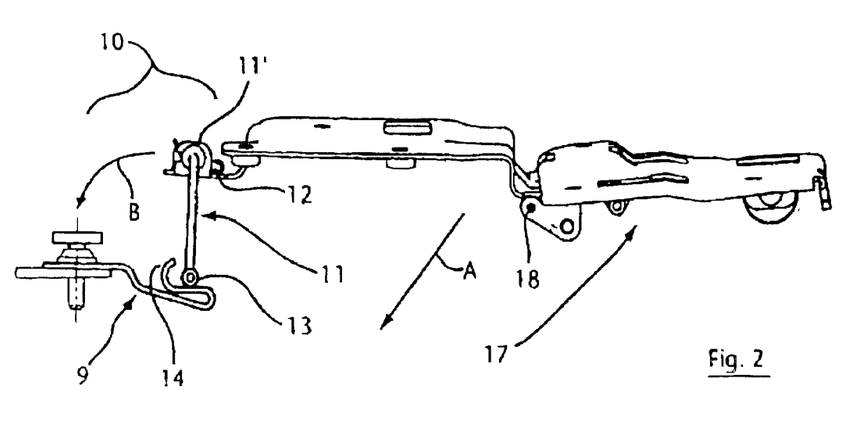
FIGS. 2–5 show a cross-section along line III—III shown in FIG. 1, in which representative folding top components, including the representative cover plate, are shown in various stages of a folding top opening operation.
Figure 3:
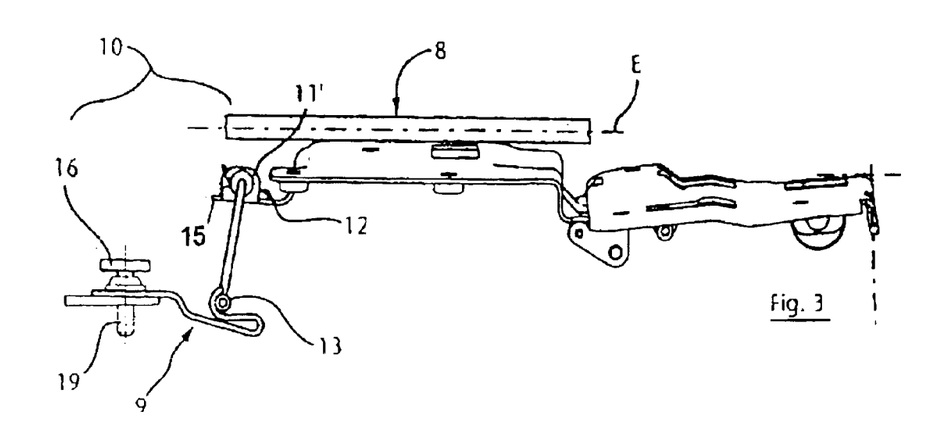

As shown in FIG. 2, the cover plate 8 may be pivoted to a substantially horizontal intermediate position (arrow A) in a first movement phase during the folding top opening operation (i.e., the passage aperture covering operation). The cover plate 8 may be pivoted to this intermediate position together with the folding top storage compartment lid 2 from an upright open position (not shown). As the cover plate 8 is moved towards the left side of FIGS. 2–5, the safety catch 10 will arrive at the contact position with respect to the guiding element 9. Subsequently, the assembly of the folding top storage compartment lid 2 and the cover plate 8 can be moved along a substantially horizontal movement path (arrow C, FIG. 4). As discussed further below, a hinge mechanism may be coupled to the rear side of the folding top storage compartment lid 2, so as to assist in effecting this motion.

Figure 4:
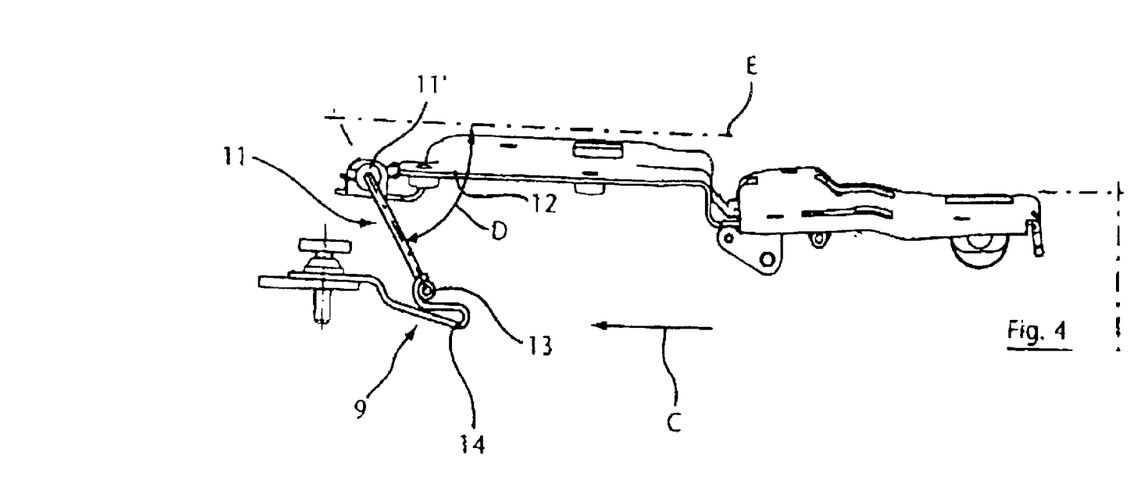
Figure 5:
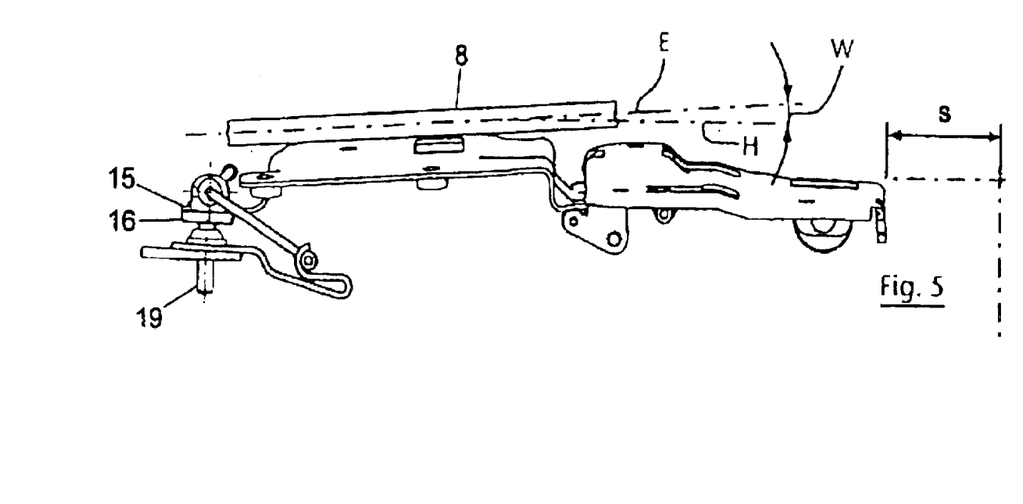

During the movement phase corresponding to the transition from FIGS. 4 to 5, the connection (engagement) of the guiding element 9 and the catching arm 11 operates as a guide so that, in addition to the movement initiated by the folding top storage compartment lid 2, the cover plate 8 is supported and guided towards a position that will accurately cover or close the passage aperture 7. By forwardly advancing the storage compartment lid 2 according to arrow C shown in FIG. 4, as well as simultaneously moving the safety catch 10 and cover plate 8 along an arched path according to arrow B shown in FIG. 2, the cover plate 8 moves so as to cover the passage aperture 7 defined within the upper side wall edge 6 of the vehicle body 1*a*. By designing the safety catch 10 according to the present teachings, the movement path B may be easily selected so that contact between other components, which are movable relative to each other, is avoided during the respective folding top opening and closing operations, while still ensuring accurate positioning of the cover plate 8 over or within the passage aperture 7.

Referring again to FIG. 2, when the guiding element 9 contacts the catching arm 11 during the folding top opening operation (i.e., the passage aperture closing operation), the catching arm 11 pivots about a supporting hinge 11' relative to the mounting plane E of the cover plate 8 due to the forward movement (arrow C) of the folding top storage compartment lid 2. When the final position is reached (FIG. 5), the catching arm 11 engages (locks on) the guiding element 9 in a holding or engagement position. Between the initial contact position of parts 9 and 11 (FIG. 2) and the final holding position (FIG. 5), the cover plate 8 is forwardly moved essentially horizontally by or along a linear distance S, as indicated in FIG. 5.

As indicated above, the safety catch 10 pivotably supports the catching arm 11 via hinge 11' at substantially the forward edge of the cover plate 8. A return spring 12, such as a coil or torsion spring or any other biasing element that provides an equivalent or similar function, can be utilized to bias or move the catching arm 11 back towards the initial position shown in FIG. 2 during the folding top closing (passage aperture opening) operation (i.e., when the foldable frame 20 is extended from the folding top storage compartment 3 through the passage aperture(s) 7 so as to disposed the foldable top 20 in the folding top closed position shown in FIG. 6).

Further, the catching arm 11 preferably includes a roller 13 designed to slidably contact the guiding element 9. In order to detachably receive the catching arm 11 using the roller 13, the guiding element 9 preferably has a holding contour 14 that serves as a holding claw. This arrangement provides an interlocking and, during the return movement (i.e., opposite to the direction of arrow C), detachable connection (engagement) of the guide element 9 and the catching arm 11.

As noted above, FIG. 5 shows the cover plate 8 in the final holding position, in which the safety catch 10 has been moved to the appropriate holding (engagement) position by the guiding element 9, whereby the catching arm 11 is supported by a bearing plate 15 on a contact base 16. In addition, the contact base 16 is preferably provided at the upper end of a retaining pin 19, which is firmly attached to the vehicle body 1*a*, thereby firmly coupling (or connecting) the guiding element 9 to the vehicle body 1*a*.

At the opposite end of this support connection, the safety catch 10 and the cover plate 8 may be coupled to the folding top storage compartment lid 2 by an articulated assembly 17 in such a manner that the cover plate 8 can be pivoted about a hinge 18, when disposed in a fitting position (angle W) that is displaced from the horizontal plane H. The cable 26 optionally may be coupled to the articulated assembly 17, so as to assist in the movement of the cover plate 8. For example, the cable 26 may be withdrawn or retracted when the folding top 20 is being moved to the folding top closed position, so as to fold the articulated assembly 17 for compact storage. Optionally, the cable 26 and drive means 27 may be designed to drive or push the cover plate 8 during the folding top opening operation.

Thus, by using relatively simple components, an optimal adjustment to the contour of the passage aperture 7 and the contour of the vehicle in the area of the upper side edge 6 is achieved.

Additional teachings relevant to, and advantageously combinable with the present teachings, are found, e.g., in commonly-owned U.S. Pat. Nos. 5,253,917; 5,558,389; 5,788,316; 5,816,644; 6,193,301; 6,447,050; 6,454,342; 6,502,891; 6,511,118, 6,536,831; 6,578,898, the contents of which are hereby incorporated by reference as if fully set forth herein.

What is claimed is:

1. A convertible vehicle comprising:
    a vehicle body having a passage aperture defined at an upper edge of a longitudinally-extending side wall, wherein a guiding element is disposed on the vehicle body in or below the passage aperture,
    a retractable folding top comprising a foldable frame including foldable, longitudinally-extending components disposed along longitudinal side edges of the foldable frame, the foldable, longitudinally-extending components being arranged and constructed to pass through the passage aperture during foldable top opening and closing operations,
    a folding top storage compartment lid movably coupled to the vehicle body,
    a cover plate movably coupled to the folding top storage compartment lid, the cover plate being arranged and constructed to move towards the passage aperture during the folding top opening operation, and
    a safety catch coupled to the cover plate and being arranged and constructed to contact and then engage the guiding element during the folding top opening operation.

2. A convertible vehicle according to claim 1, wherein the cover plate is arranged and constructed to be moved into an engagement position in the area of the passage aperture by the safety catch during the folding top opening operation, the cover plate being further arranged and constructed to be moved away from the passage aperture during the folding top closing operation.

3. A convertible vehicle according to claim 2, wherein the cover plate is arranged and constructed to be:
    movable together with the folding top storage compartment lid,
    pivoted into an intermediate position during an initial movement phase, wherein the safety catch contacts the guiding element at the intermediate position, and
    then extended along an arched, but substantially horizontal movement path in a subsequent movement phase, thereby securely engaging the safety catch with the guiding element.

4. A convertible vehicle according to claim 3, further comprising an actuation member arranged and constructed to move the cover plate into the intermediate position independent of the movement of the folding top storage compartment lid.

5. A convertible vehicle according to claim 3, wherein the safety catch comprises a pivotable catching arm that is arranged and constructed to contact and engage the guiding element.

6. A convertible vehicle according to claim 5, wherein the catching arm is arranged and constructed to be:
- positioned so as to contact the guiding element during the initial movement phase of the folding top opening operation,
- then pivoted relative to a mounting plane of the cover plate by forward movement of the folding top storage compartment lid, and
- then firmly engaged with the guiding element in an engagement position when the folding top has been opened.

7. A convertible vehicle according to claim 6, wherein the catching arm is pivotably supported at a forward edge of the cover plate and is biased towards an initial position by a biasing element.

8. A convertible vehicle according to claim 7, wherein the biasing element is a spring.

9. A convertible vehicle according to claim 8, wherein the catching arm comprises a roller that is arranged and constructed to slidably contact and then engage the guiding element during the folding top opening operation.

10. A convertible vehicle according to claim 9, wherein the guiding element has a holding contour arranged and constructed to receive the roller.

11. A convertible vehicle according to claim 10, further comprising a retaining pin firmly coupling the guiding element to the vehicle body, the retaining pin having a contact base defined at a terminal, upper end of the retaining pin that is arranged and constructed to support a bearing plate defined within the safety catch.

12. A convertible vehicle according to claim 11, further comprising a hinge pivotably coupling the safety catch to an articulated, supporting part of the folding top storage compartment lid, the hinge being disposed at an opposite end from a supporting hinge disposed within the safety catch, which supporting hinge pivotably supports the catching arm.

13. A convertible vehicle according to claim 12, wherein the foldable frame supports a roof covering.

14. A convertible vehicle according to claim 1, wherein the safety catch comprises a pivotable catching arm that is arranged and constructed to contact and then securely engage the guiding element during the folding top opening operation.

15. A convertible vehicle according to claim 14, wherein the catching arm is arranged and constructed to be:
- positioned so as to contact the guiding element during an initial phase of the folding top opening operation,
- then pivoted relative to a mounting plane of the cover plate by forward movement of the folding top storage compartment lid, and
- then firmly engaged with the guiding element in an engagement position when the folding top has been opened.

16. A convertible vehicle according to claim 14, wherein the catching arm is pivotably supported at a forward edge of the cover plate and is biased towards an initial position by a spring.

17. A convertible vehicle according to claim 14, wherein the catching arm comprises a roller that is arranged and constructed to slidably contact and then securely engage the guiding element during the folding top opening operation and the guiding element has a holding contour arranged and constructed to receive the roller.

18. A convertible vehicle according to claim 1, further comprising a retaining pin firmly coupling the guiding element to the vehicle body, the retaining pin having the retaining pin defined at a terminal, upper end of a contact base that is arranged and constructed to support a bearing plate defined within the safety catch.

19. A convertible vehicle according to claim 1, further comprising a hinge pivotably coupling the safety catch to an articulated, supporting part of the folding top storage compartment lid, the hinge being disposed at an opposite end from a supporting hinge disposed within the safety catch, which supporting hinge pivotably supports a catching arm.

20. A convertible vehicle according to claim 1, wherein the foldable frame supports a roof covering.

* * * * *

UNITED STATES PATENT AND TRADEMARK OFFICE
CERTIFICATE OF CORRECTION

PATENT NO.    : 6,814,390 B2  
DATED         : November 9, 2004  
INVENTOR(S)   : Norbert Habacker It is certified that error appears in the above-identified patent and that said Letters Patent is hereby corrected as shown below:

<u>Title page,</u>
Insert Item -- [30] Foreign Application Priority Data
 September 28, 2002 (DE) ...................... 102 45 361.6 --

Signed and Sealed this

Ninth Day of August, 2005

JON W. DUDAS
*Director of the United States Patent and Trademark Office*